United States Patent [19]
Sipilä

[11] Patent Number: 6,163,546
[45] Date of Patent: Dec. 19, 2000

[54] METHOD AND SYSTEM FOR DATA TRANSMISSION

[75] Inventor: Tuomo Sipilä, Helsinki, Finland

[73] Assignee: Nokia Mobile Phones Limited, Espoo, Finland

[21] Appl. No.: 08/894,428

[22] PCT Filed: Feb. 19, 1996

[86] PCT No.: PCT/FI96/00092

§ 371 Date: Oct. 30, 1997

§ 102(e) Date: Oct. 30, 1997

[87] PCT Pub. No.: WO96/26616

PCT Pub. Date: Aug. 29, 1996

[30] Foreign Application Priority Data

Feb. 20, 1995 [FI] Finland ..................................... 950783

[51] Int. Cl.[7] ......................................................... H04J 3/22
[52] U.S. Cl. .......................................... 370/466; 455/424
[58] Field of Search ..................................... 370/328, 336, 370/345, 465, 466, 467, 277; 455/74.1, 424, 426, 462

[56] References Cited

U.S. PATENT DOCUMENTS 5,175,758  12/1992  Levanto et al. ............................ 379/57
5,878,343   3/1999  Robert et al. ............................ 455/424

OTHER PUBLICATIONS

ETSI/TC–GSM, Point–to–Point Short Message Service Support . . . , 1994.
ETSI/TC–GSM, Technical Realization of the Short . . . , 1993.

Alvesalo, Antero., "DECT system as an extension to GSM infrastructure" In: MRC Mobile Radio Conference, 1991, Nice, France, pp. 201–206.

Dittrich, I et al., "Implementation of the GSM–data–services into the mobile radio system" In: MRC Mobile Radio Conference, 1991, Nice, France, pp. 73–83.

Redl et al, "An introduction to GSM", Artech House Publishers, Chapter 4, p. 56, 1995.

Siemens, et al. "Implementation of the GSM–data–services into the mobile radio system". In : MRC Mobile Radio Conference, Nice, France, section 5, 1991.

Primary Examiner—Valencia Martin-Wallace
Assistant Examiner—Kim T. Nguyen
Attorney, Agent, or Firm—Perman & Green, LLP

[57] ABSTRACT

The invention relates to a method and a system for transmitting short messages between a short message service center (SC), a fixed part (FP), like a base station and a portable part (PP), like a mobile station. In accordance with the invention, a data transfer protocol at least partly complying with the DECT system is used between the portable and fixed part and a data transfer protocol that is at least partly in accordance with the GSM system is used between the fixed part (FP) and the service center (SC). The solution according to the invention provides transmission of short messages within the DECT system and between the DECT system and an external system through a GSM type short message service center.

30 Claims, 4 Drawing Sheets

METHOD AND SYSTEM FOR DATA TRANSMISSION

BACKGROUND OF THE INVENTION

1. Field of the Invention

The present invention relates to a method and system for short message transmission by using the DECT data communications system.

2. Description of the Prior Art

For short-range data transfer, e.g. inside buildings, it is known to use cordless paging and telephone systems, like those according to CEPT CT1 and CEPT CT2 standards. However, these kind of systems do not usually provide transfer of data in text form, the so called short messages. Further, it is not possible to transfer short messages between the system and the public telenetwork.

To be used mainly for speech transmission there are cordless mobile phone systems like NMT (Nordic Mobile Telephone System) and GSM (Global System for Mobile Communications). These are meant as long-range communication networks. The digital GSM-system also provides short message transmission. The GSM-system has been described in the following publication, i.a.: M.Mouly, M-B.Pautet: The GSM System for Mobile Communications, 1992.

Figure 1:
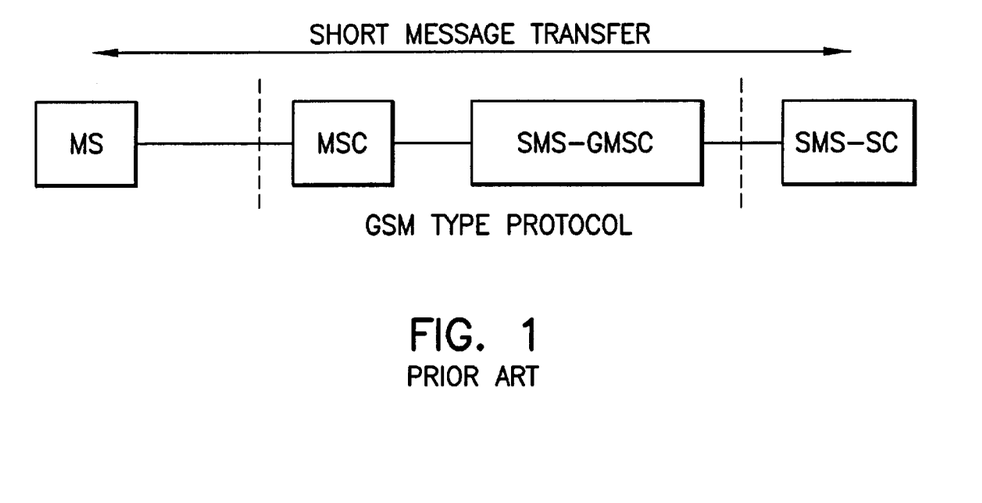
FIG. 1 is a block diagram of short message transfer of the GSM system.

In the GSM system the short messages are transmitted through the short message service center SC. The mobile terminated short messages (SM-MT) are transferred from the short message service center through the short message gateway mobile services switching center SMS-GMSC and the GSM mobile services switching center MSC to the mobile station MS (FIG. 1). In the mobile station the short message can be stored in the memory of the SIM card (Subscriber Identity Module) or the mobile station (MS). Mobile originated short messages (SM-MO) are transferred along the respective transmission path to the short message service center SC transmitting the short message further to the desired address.

Short message transfer does not require establishment of an end-to-end traffic path between the mobile station and the short message service center. The mobile station can send and receive short messages even during a call or when it is not in a state for receiving calls.

Figure 2:
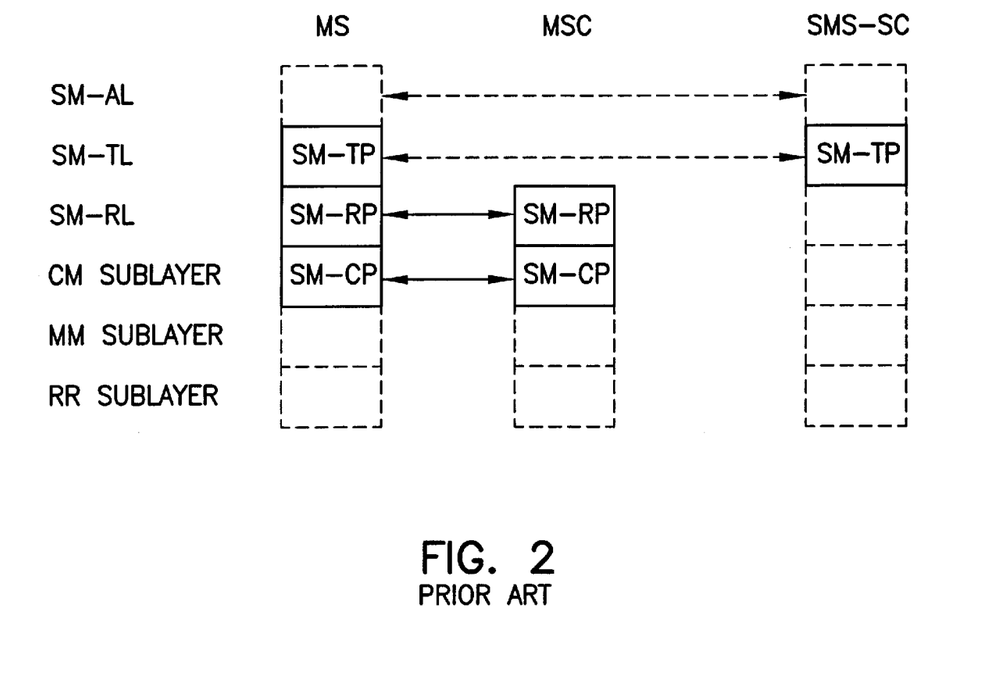
FIG. 2 shows protocol layers and protocols used by the short message transfer of the GSM system.

FIG. 2 illustrates protocols and protocol layers used in short message transfer of the GSM system. There are four layers in the short message service protocol structure: lower layers, short message relay (SM-LR), short message transfer (SM-LT) and application layer (SM-AL). The short message transfer protocol SM-TP, short message relay protocol SM-RP and short message control protocol SM-CP are used for the transfer of short messages.

The control protocol SM-CP is used between the mobile services switching center MSC and the mobile station MS and it is a part of the connection management layer CM. Its purpose is to carry the information of the upper layers. There are three messages used: {CP-DATA}, {CP-ACK} and {CP-ERROR}.

Also the relay protocol SM-RP is used between the mobile switching center and the mobile station. The protocol data units PDU are carried in the user data field of the control protocol SM-CP. The purpose of the SM-RP protocol is to manage references and addresses. There are four messages used: {RP- DATA}, {RP-SMMA}, {RP-ACK} AND {RP-ERROR}. The {RP-SMMA} is a signal of a released short message memory.

The short message transfer protocol SM-TP is an end-to-end protocol used between the service center SC and the mobile station MS. It includes the following messages: {SMS-DELIVER}, {SMS-SUBMIT}, {SMS-COMMAND}, {SMS-STATUS-REPORT}, {SMS-SUBMIT- REPORT} and {SMS-DELIVERY-REPORT}. SM-TP layer information is carried in the user data fields of the {RP-DATA} and {RP-ERROR} messages of the SM-RP layer. {RP-DATA} may contain {SMS DELI-VER}, {SMS-SUBMIT}, {SMS-COMMAND} and {SMS-STATUS-REPORT} SM-TP layer massages whereas {RP-ERROR} may contain {SMS-SUBMIT-REPORT} and {SMS-DELIVERY-REPORT} messages. {SMS-DELIVER} is used in mobile terminated short message transfer and {SMS-SUBMIT} in mobile originated short message transfer. These messages are used for delivering the short message data. The lower layers are responsible for delivery of the acknowledgements.

The short message service of the GSM system is described in more detail in the following publications:

Recommendation GSM 04.11 Version 4.7.0: Poit-to Point Short Message Service Support on Mobile Radio Interface, European Telecommunications Standards Institute/TC-GSM, 1994, 114 pages, Recommendation GSM 03,40 Version 3.5.0: Technical Realization of the Short Message Service—Point-to Point, European Telecommunications Standards Institute/TC-GSM, 1993, 100 pages.

The above mentioned mobile service systems work on a wide area and because of the wide range there is a rather restrictic amount of radio channels to be used. Therefore it is not profitable to use these systems at short range, e.g. for a cordless data transmission inside a building.

For the cordless communications at short range it has been developed the so called DECT system (Digital European Cordless Telecommunications), a cordless data/voice transmission system that provides profitable data/voice transfer means for calls. However, a disadvantage of this system is that transfer of short messages is not provided.

The structure of the cordless telecommunications system DECT is described in more detail in the following publication: European Telecommunication Standard ETS 300 175 1-9: Radio Equipment and Systems (RES); Digital European Cordless Telecommunications (DECT) Common Interface, European Telecommunications Standards Institute, 1992.

So, with reference to what has been stated above, by the technique of prior art it is not possible with reasonable costs to establish a cordless, short-range data transmission system, that would provide point-to-point short message transfer as well within the system as between the system and an external data transfer network like public telenetwork.

OBJECT OF THE INVENTION

An object of the present invention is to provide a method and system for transferring short messages through the cordless DECT system, so that the above mentioned disadvantages would be solved. What is characteristic for a method according to this invention is stated in the characterizing part of the claim 1 and what is characteristic for a system according to this invention is stated in the characterizing part of the claim 17. A number of preferred embodiments of the invention are described in dependent claims.

SUMMARY OF THE INVENTION

Figure 3:
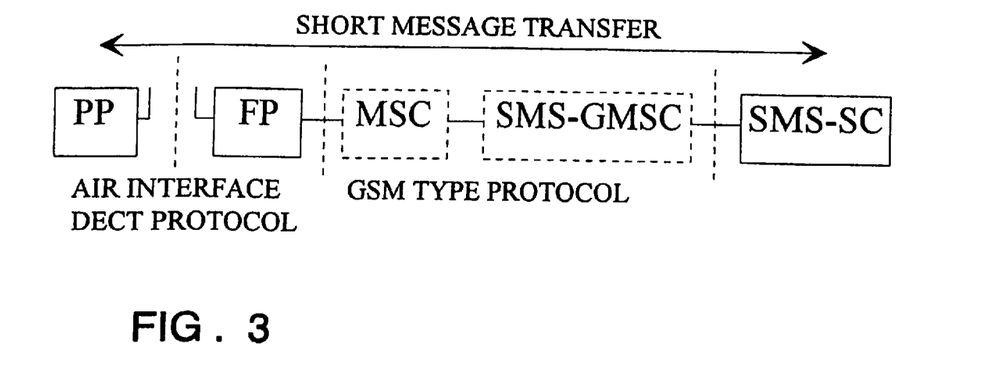
FIG. 3 shows a block diagram according to the present invention in general.

An essential idea of the invention is to combine the short message service center SC and the DECT system so that a short message data transmission protocol at least partly of DECT type is used between the portable part PP and the fixed part FP and a data transmission protocol preferably of GSM type is used between the fixed part FP and the short message service center SC (FIG. 3). The protocol interworking can be done in the interworking unit IWU. The portable part means here a mobile station, a cordless phone or other portable terminal substantially in accordance with the DECT system. Correspondingly, the fixed part FP means a base station or some other immobile data transmitting means substantially in accordance with the DECT system, that transfers data cordlessly with one or many portable parts and mainly through wire to other telecommunication systems.

BRIEF DESCRIPTION OF THE DRAWINGS

In the following the present invention is described with help of some preferred embodiments, with reference to the accompanying drawings, where.

DETAILED DESCRIPTION OF THE PREFERRED EMBODIMENT

The following abbreviations will be used in figures and in the text:

| | |
|---|---|
| PP | Portable part |
| FP | Fix part |
| MSC | Mobile services switching center |
| GMSC | Gateway mobile services switching center |
| SMS-GMSC | Short message gateway mobile services switching center |
| SC | Short message service center |
| SMS-SC | Short message service center |
| IWU | Interworking unit |
| LAPU | Link access protocol user |
| C | Control level of data transfer protocol |
| U | User level of data transfer protocol |
| SMS | Short message services |
| SM-MO | Mobile originated short message |
| SM-MT | Mobile terminated short message |
| CC | Call Control |
| COMS | Connection oriented message service |
| DLC | Data link control |
| MAC | Medium access control layer |
| PHY | Physical layer |
| SM-TP | Short message transfer protocol |
| SM-RP | Short message relay protocol |
| SM-CP | Short message control protocol |
| TP | Transfer protocol |
| CP | Control protocol |
| RP | Relay protocol |
| PDU | Protocol data unit |
| TL | Transfer layer |
| CL | Control layer |
| RL | Relay layer |
| AL | Application layer |
| CM | Connection management |
| MM | Mobility management |
| RR | Radio resource management |

In this description it has been used generally known terms of the DECT and GSM systems explained in more detail, e.g., in the publications mentioned as references in the first part.

Two types of messages can be discriminated in the short message transfer: the mobile originated short messages (SM-MO) and the mobile terminated short messages (SM-MT). When no transfer direction has been separately mentioned, the statement is applicable to both of the transfer directions.

This invention will be described in the following by detailing two embodiments and their preferred alternative implementations. In the first embodiment the short messages are transferred between the fixed part FP and the short message service center SC through the GSM service center and in the second embodiment the short messages are transferred directly between the fixed part FP and the short message service center. An advantage of the former embodiment lies in the fact that the mobility management MM of the GSM system can be used. An advantage of the latter embodiment is that the DECT system can function independently of the GSM-network.

Figure 4:
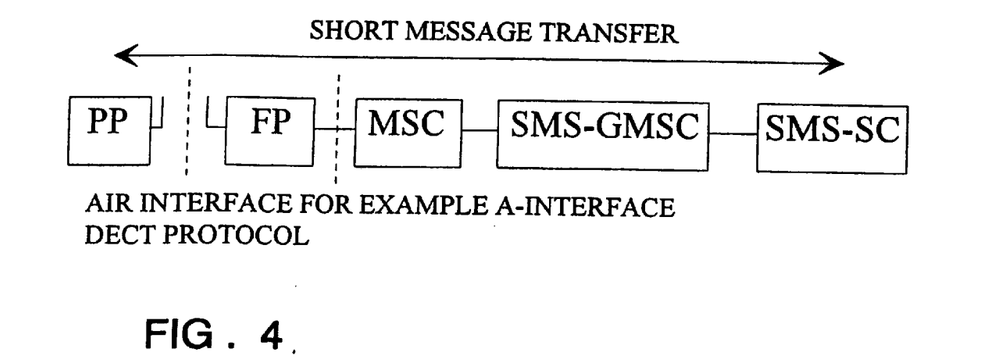
FIG. 4 shows a block diagram according to the present invention when the short messages are transferred through the GSM service center.

FIG. 4 shows a block diagram of the system according to this invention when using the GSM service center. The DECT/GSM interworking implemented by using the DECT/GSM interworking profile is used in this embodiment. In this solution the short messages are transmitted between the service center and the DECT system in the GSM network and a logical access point to the DECT system can be, e.g., the A-interface or the A-bis-interface of the GSM system. The A-interface is described in detail in the CCITT recommendations Q.702, Q.703, Q.704 and Q.707 as well as in the ETSI recommendation TS GSM 08.06. By using this embodiment the mobility management MM can be implemented with help of the GSM system.

These embodiments have several alternative implementations depending on, among others, which interworking level of the data transfer protocol or which level of the radio interface is used. Interworking level here means the uppermost protocol layer terminated to the fixed part FP, on which layer the mentioned protocol is mapped to the DECT protocol or alternatively the protocol is ignored or simulated by the interworking unit IWU.

As interworking level can preferably be used protocol SM-CP, SM-RP or SM-TP.

Figure 6:
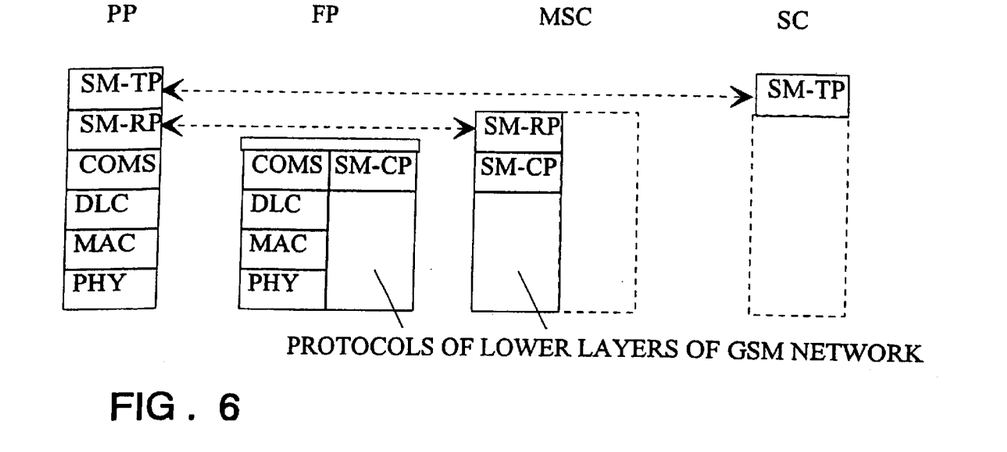
FIG. 6 shows one signal flow diagram according to the present invention when using the control protocol SM-CP as interworking level between the fixed part and the GSM service center.

FIG. 6 shows a solution where the interworking level is the control protocol SM-CP. The transfer protocol SM-TP and relay protocol SM-RP are transmitted intact over the radio interface. In this case the control protocol SM-CP messages are mapped into the respective DECT network layer messages.

An advantage of this solution is that the service standard of the GSM system will be reached, whereby an end-to-end acknowledgement of the message is provided with as few protocol interworking as possible.

Figure 7:
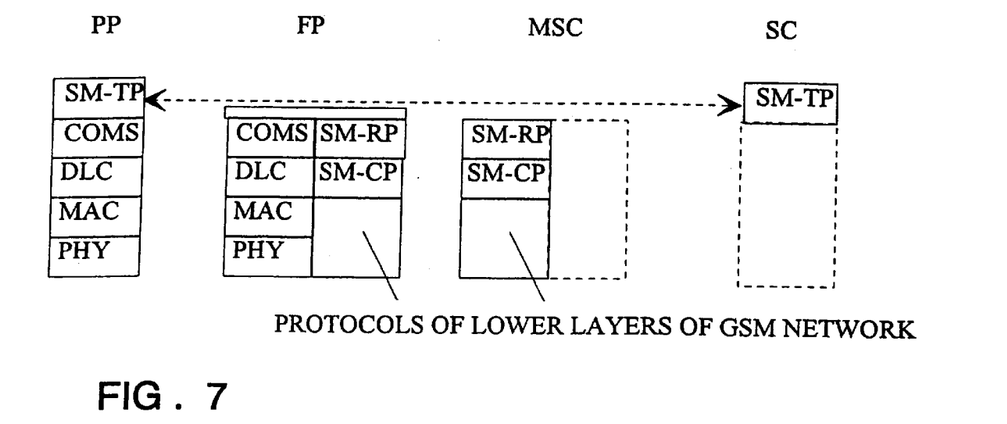
FIG. 7 shows one signal flow diagram according to the present invention when using the relay protocol SM-RP as interworking level between the fixed part and the GSM service center.

FIG. 7 shows a solution where as well the relay protocol SM-RP as the control protocol SM-CP interwork with the interworking unit IWU of the fixed part FP. In this case either one or both of the SM-RP and SM-CP messages will be mapped to respective DECT network layer messages. There the DECT protocols provide the services of the relay protocol SM-RP to the SM-TP layer in the portable part, i.e. they replace the relay protocol SM-RP in the DECT air interface.

An advantage of this solution lies in the fact that the implementation of the portable part is simple, as the number of protocols to be brought to the portable part is small, but still a good service standard will be reached.

Figure 8:
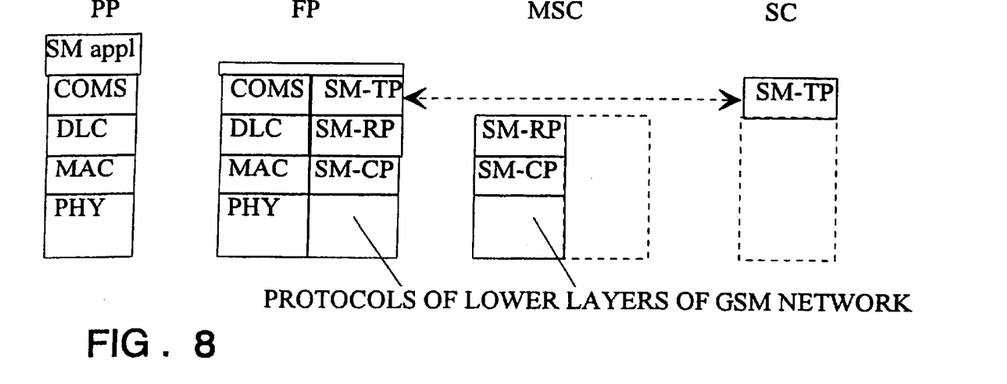
FIG. 8 shows one signal flow diagram according to the present invention when using the transfer protocol SM-TP as interworking level between the fixed part and the GSM service center.

FIG. 8 shows a solution where the interworking is on the layer of the transfer protocol SM-TP. The SM-RP or/and SM-CP messages will be mapped to the DECT network layer messages. The SM-TP user data information will be transmitted across the air interface while the fixed part utilizes the rest of the in- formation of the SM-TP protocol. In this case the short message application is DECT specific. Further, in this case the short messages are stored by the fixed part until the portable part can be reached. Thus, the fixed part acts as an intermediate short message service center. Another option is that the fixed part FP informs the service center SC if the portable part PP is not available.

Figure 5:
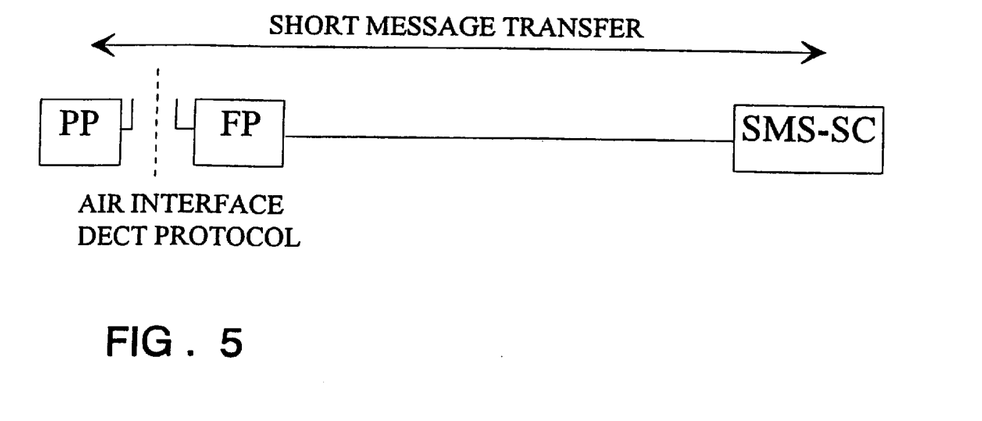
FIG. 5 shows a block diagram according to the present invention when the short messages are transferred directly through the fixed part and the short message service center.

With this solution it has to be accepted a lower service standard, but an advantage of this solution is that it provides the basic functions of short message transmission with a very simple and inexpensive construction of the portable part. In the above mentioned solutions the lowest interworking level is the SM-CP protocol. In addition to the SM-CP protocol the protocol configuration of FIG. 5 also has the interworking of SM-RP and the configuration of FIG. 6 also the interworking of SM-RP and SM-TP. In the cases of FIGS. 5 and 6 it is also possible that the information of the SM-CP protocol is not transferred between the fixed part FP and the portable part PP, in which case the control protocol SM-CP is terminated in the fix part. In that case the relay protocol SM-RP and the respective DECT protocol include the required control information.

In the second embodiment of the present invention the interworking of the DECT system and the short message service center SC (FIG. 5) is used. In this case the DECT system can be directly connected with the short message service center. The carrier for the short messages can be an operator specific network, for instance the X.25 network. Services of the transfer protocol SM-TP and the SM-RL layer can be provided f.ex. according to the GSM-SMS recommendations. An advantage of this option is that the DECT system does not have to be connected directly to the GSM network. So the DECT network can act independently without support of the GSM system but still offering a short message transmission of GSM type. Thus, the functional demands for the portable part and the fixed part are lower and they are easier to be implemented.

When transmitting short messages directly between the fixed part and the short message service center the interworking can be on the level of the transfer protocol SM-TP or a protocol layer under SM-TP, like the relay layer SM-RL. The corresponding solutions are illustrated in FIGS. 9 and 10.

Figure 9:
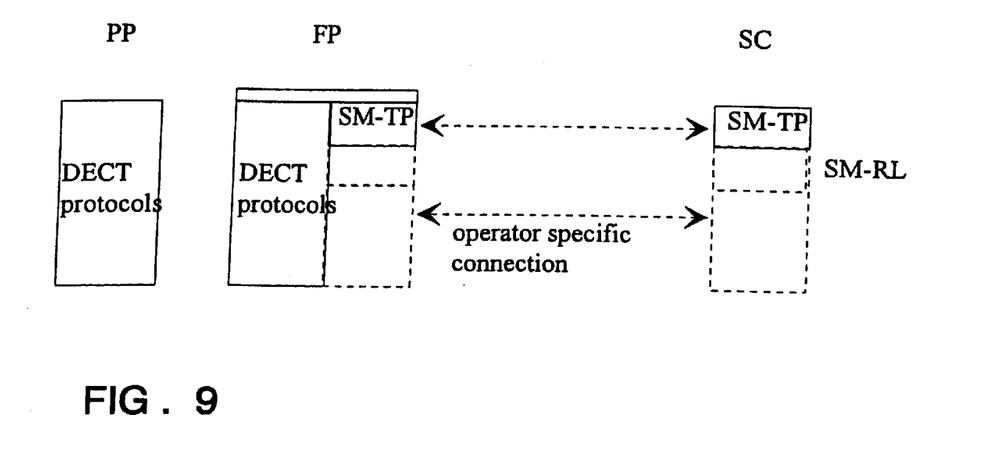
FIG. 9 shows one signal flow diagram according to the present invention when using the protocol under the transfer protocol SM-TP as interworking level between the fixed part and the short message service center and FIG. 10 shows one signal flow diagram according to the present invention when using the transfer protocol SM-TP as interworking level between the fixed part and the short message service center.

In the solution illustrated in FIG. 9 the messages of the transport protocol SM-TP are brought intact to the portable part PP which has an application for handling messages in form of the transfer protocol SM-TP. In this case the interworking is done on the protocol layer under the transfer protocol layer SM-TP, which provides services that correspond with the GSM specification.

With this solution it has to be accepted a lower service standard, but an advantage of this solution is that it provides the basic functions of short message transmission with a very simple and inexpensive construction of the portable part PP.

Figure 10:
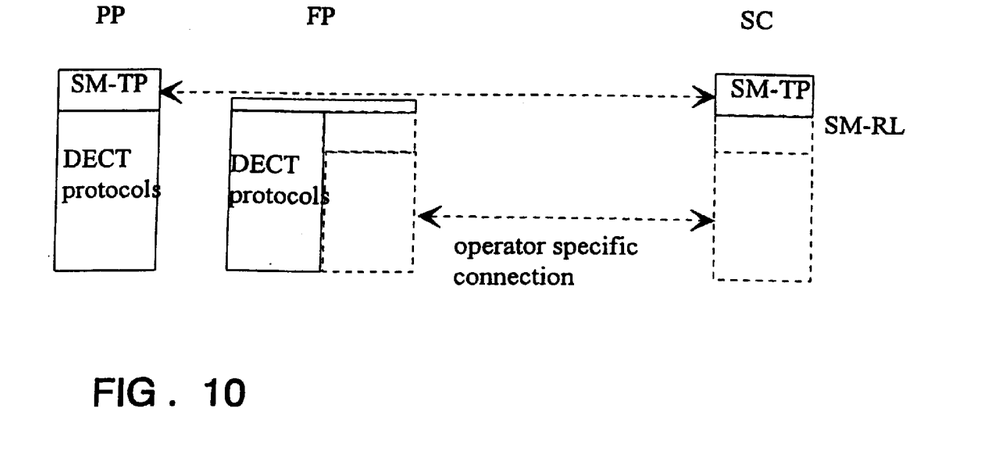

In the solution illustrated in FIG. 10 the interworking level is the transfer protocol SM-TP. In this case the transfer protocol SM-TP in question and the protocol under it interwork with the respective DECT protocols in the fixed part FP. There will be a DECT proprietary short message application which has similar characteristics as the GSM short message application. In this case the fixed part FP acts as a short message receiver transmitting the messages in a simple form to the portable part. The fixed part can act as an intermediate short message service center and store the messages for the portable part, if the portable part is not available. Alternatively it may signal to the service center SC that the portable part is not available, so that the service center SC can store the message.

An advantage of this solution is that the implementation of the portable part is simple, as the number of protocols to be brought to the portable part is small, but still a good service standard will be reached.

With the direct interworking of the DECT system and the short message center the interworking of the protocol under the transfer protocol layer SM-TP will be required, since the acknowledgements of the transfer protocol SM-TP are delivered by this protocol layer. Services provided by the layer can be implemented according to the GSM specifications.

In both of the foregoing embodiments the radio interface control will be implemented by using the DECT system. This can be done with the connection oriented message service COMS, on the call control layer CC or with some DECT data profile. The connection oriented message service COMS provides transfer of acknowledgements of the transmitted information, which improves the reliability of the data transmission. An advantage of acting on the call control layer is that the CC entity already existing in every portable part and fixed part can be used and there is no need to establish or use a separate protocol especially for the short message transmission in order to carry the messages.

Several DECT subsystems can be connected to the short message service center SC, a part of which can be directly connected to the short message service center SC and a part through the GSM service center. In this case it is preferable to use the respective interworking level between the fixed part and the short message service center and between the fixed part and the GSM service center. Thus a portable part PP of the same type can be used in all DECT subsystems.

An active portable part PP can receive and send short messages even during a call and the services do not require establishment of an end-to-end traffic path.

By using the solution according to the present invention the short-range communication can be realized in different ways by using components of the DECT system, the manufacturing costs of which are reasonable. With this invention short messages can be transmitted between different parts of the system and between the system and an external one.

As a summary a number of combinations of above mentioned example solutions can be seen on the following table:

| GSM service as intermediate | Interworking level | Air interface |
|---|---|---|
| YES | CP | CC |
| YES | CP | COMS |
| YES | RP | CC |
| YES | RP | COMS |
| YES | TP | CC |
| YES | TP | COMS |
| NO | Level under TP | CC |
| NO | Level under TP | COMS |
| NO | TP | CC |
| NO | TP | COMS |

Each of the above mentioned combinations provides advantages of the respective configurations mentioned in the combination, the said advantages being stated in the foregoing description.

Some embodiments and preferred configurations of the method according to the present invention have been described in the foregoing, but naturally various modifications of the principle according to the invention can be made within the scope of protection of the claims, e.g. concerning functional details and the range of use. Constructions of the devices to be used in connection with the present invention have not been described in detail in this specification as it is seen as a part of normal knowlege of the field, to be put in practice by a specialist after having read this specification.

What is claimed is:

1. A method for transmitting short messages between a portable part (PP), a fixed part (FP), and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers, and a determined protocol level is used as an interworking level between the first data transfer protocol and the second data transfer protocol so that the interworking level of the second data transfer protocol interworks with the respective level of the first data transfer protocol; and wherein there are protocols on at least two layers comprising a higher protocol layer and a lower protocol layer, the higher protocol layer comprising a short message transfer protocol (SM- TP), and said interworking level comprises a protocol under the short message transfer protocol (SM-TP) and the protocol under the transfer protocol interworks with the respective DECT protocol, whereas the transfer protocol (SM-TP) is transmitted between the portable part and the short message service center substantially intact.

2. A method in accordance with claim 1, wherein the protocol interworking of the first and the second data transfer protocols is done in the fixed part (FP).

3. A method in accordance with claim 1, wherein said second data transfer protocol is in accordance with the GSM system.

4. A method in accordance with claim 1, wherein the lower protocol layer comprises a short message relay protocol (SM-RP) and information within a lower level protocol is transmitted between the portable part and the fixed part as a DECT protocol in the form of the short message relay protocol (SM-RP).

5. A method for transmitting short messages between a portable part (PP), a fixed part (FP). and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol lavers, and a determined protocol level is used as an interworking level between the first data transfer protocol and the second data transfer protocol so that the interworking level of the second data transfer protocol interworks with the respective level of the first data transfer protocol; and wherein there are protocols on at least two layers comprising a higher protocol layer and a lower protocol layer, and wherein the higher protocol layer comprises a short message transfer protocol (SM-TP), which is used as the interworking level, and the short message transfer protocol (SM-TP) and the protocols on a lower protocol layer interwork with the respective DECT protocols.

6. A method for transmitting short messages between a portable part (PP), a fixed part (FP) and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers. and a determined protocol level is used as an interworking level between the first data transfer protocol and the second data transfer protocol so that the interworking level of the second data transfer protocol interworks with the respective level of the first data transfer protocol, and wherein there are protocols on three layers, the lowest of the three protocol layers comprising a short message control protocol (SM-CP), the middle of the three protocol layers comprising a short message relay protocol (SM-RP) and the highest of the three protocol layers comprising a short message transfer protocol (SM- TP), and wherein the short message control protocol (SM-CP) is used as the interworking level, and the short message control protocol interworks with the respective DECT protocol whereas the short message transfer protocol (SM-TP) and the short message relay protocol (SM-RP) are transmitted through the fixed part (FP) substantially intact, and wherein short messages between the fixed part and the short message service center are transmitted through a GSM mobile services switching center (MSC).

7. A method for transmitting short messages between a portable part (PP). a fixed part (FP) and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers, and a determined protocol level is used as an interworking level between the first data transfer protocol and the second data transfer protocol so that the interworking level of the second data transfer protocol interworks with the respective level of the first data transfer protocol, and wherein there are protocols on three layers, the lowest of the three protocol layers comprising a short message control protocol (SM-CP), the middle of the three protocol layers comprising a short message relay protocol (SM-RP) and the highest of the three protocol layers comprising a short message transfer protocol (SM-TP), and wherein the short message relay protocol (SM-RP) is used as the interworking level, and the short message relay protocol (SM-RP) and the short message control protocol (SM-CP) interwork with the respective DECT protocols, whereas a short message transfer protocol (SM-TP) is transmitted through the fixed part (FP) substantially intact, and wherein short messages between the fixed part and the short message service center are transmitted through a GSM mobile services switching center (MSC).

8. A method for transmitting short messages between a portable part (PP), a fixed part (FP) and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers, and a determined protocol level is used as an interworking level between the first data transfer protocol and the second data transfer protocol so that the interworking level of the second data transfer protocol interworks with the respective level of the first data transfer protocol, and wherein there are protocols on three layers, the lowest of the three protocol layers comprising a short message control protocol (SM-CP), the middle of the three protocol layers comprising a short message relay protocol (SM-RP) and the highest of the three protocol layers comprising a short message transfer protocol (SM-TP), and the short message relay protocol (SM-RP) interworks with the respective DECT protocol whereas the short message control protocol (SM-CP) is not transmitted between the portable part and the fixed part, and the short message transfer protocol (SM-TP) is transmitted through the fixed part (FP) substantially intact, and wherein short messages between the fixed part and the short message service center are transmitted through a GSM mobile services switching center (MSC).

9. A method for transmitting short messages between a portable part (PP), a fixed part (FP) and a short message service center (SC) so that the information is transferred between the portable part (PP) and the fixed part (FP) through a radio interface, comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers. and a determined protocol level is used as an interworking level between the first data transfer protocol and the second data transfer protocol so that the interworking level of the second data transfer protocol interworks with the respective level of the first data transfer protocol, and wherein there are protocols on three layers, the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message transfer protocol (SM-TP) is used as interworking level, and the short message transfer protocol (SM-TP), the short message relay protocol (SM-RP), and the short message control protocol (SM-CP) interwork with the respective DECT protocols, and wherein short messages between the fixed part and the short message service center are transmitted through a GSM mobile services switching center (MSC).

10. A method for transmitting short messages between a portable part (PP), a fixed part (FP) and a short message service center (SC) so that the information is transferred between the portable part (PP) and the fixed part (FP) through a radio interface. comprising the steps of:

a first data transfer protocol corresponding with the DECT system is used in the data transfer between the portable part (PP) and the fixed part (FP), and a second data transfer protocol is used in the data transfer between the fixed part (FP) and the short message service center (SC), and wherein the first data transfer protocol and the second data transfer protocol both comprise different protocol layers, and a determined protocol level is used as an interworking level between the first data transfer protocol and the second data transfer protocol so that the interworking level of the second data transfer protocol interworks with the respective level of the first data transfer protocol, and wherein there are protocols on three layers, the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message transfer protocol (SM-TP) is used as the interworking level, and the short message transfer protocol (SM-TP) and the short message relay protocol interwork with the respective DECT protocols whereas the information of the short message control protocol (SM-CP) is not transmitted between the portable part (PP) and the fixed part (FP), and wherein short messages between the fixed part and the short message service center are transmitted through a GSM mobile services switching center (MSC).

11. A method in accordance with claim 1, wherein the portable part (PP) comprises a short message application of the GSM type.

12. A method in accordance with claim 5, wherein the portable part (PP) comprises a short message application of the DECT type.

13. A method in accordance with claim 1, wherein a call control layer (CC) is used in the data transfer between the fixed part (FP) and the portable part (PP).

14. A method in accordance with claim 1, wherein a connection oriented message service (COMS) is used in the data transfer between the fixed part (FP) and the portable part (PP).

15. A system for transmitting short messages between a portable part (PP), a fixed part (FP), and a short message service center (SC) so that information is transferred between the portable part (PP) and the fixed part (FP) through a radio interface, comprising:
    means for using a first data transfer protocol in the data transfer between the portable part and the fixed part, said first data transfer protocol being in accordance with the DECT system,
    means in the fixed part for using a second data transfer protocol in the data transfer between the fixed part and the short message center, wherein the first data transfer protocol and the second data transfer protocol both comprise different protocol layers,
    means for using a determined protocol level as an interworking level between said first data transfer protocol and said second data transfer protocol so that the interworking level of the second data transfer protocol interworks with the respective level of said first data transfer protocol, and
    means for using protocols on at least two layers comprising a higher protocol layer and a lower protocol layer, such that the higher protocol layer comprises a short message transfer protocol (SM-TP) and is used as the interworking level, and the short message transfer protocol (SM-TP) and the protocols on a lower protocol layer interwork with the respective DECT protocols.

16. A system in accordance with claim 15, wherein the portable part (PP) and the fixed part (FP) have means for signalling in the radio interface according to the DECT system.

17. A system in accordance with claim 15, wherein the second data transfer protocol is in accordance with the GSN system.

18. A system in accordance with claim wherein the fixed part (FP) has means for interworking of the first data transfer protocol with the second data transfer protocol.

19. A system in accordance with claim 18, wherein said means for protocol interworking include an interworking unit (IWU).

20. A system in accordance with claim 15, wherein the portable part (PP) has means for reading and/or forming transfer protocols (SM-TP) in accordance with the GSM system.

21. A system in accordance with claim 20, wherein the portable part (PP) has means for reading and/or forming relay protocols (SM-RP) in the form of the GSM system.

22. A system in accordance of with claim 15, wherein the portable part (PP) has means for storing short messages in a card equipped with memory, like a SIM card complying with the GSM system.

23. A system in accordance with claim 15, wherein on the data transfer path between the fixed part (FP) and the short message service center (SC) there is a center (MSC) of the GSM type for transmission of short messages.

24. A system in accordance with claim 23, wherein as interface between the fixed part (FP) and the GSM center (MSC) there is an A-interface of the GSM system.

25. A system for transmitting short messages between a portable part (PP), a fixed part (FP), and a short message service center (SC) so that the information is transferred between the portable part (PP) and the fixed part (FP) through a radio interface, comprising:
    means for using a first data transfer protocol corresponding with the DECT system in the data transfer between the portable part (PP) and the fixed part (FP), and
    means for using a second data transfer protocol in the data transfer between the fixed part (FP) and the short message service center (SC), wherein the first data transfer protocol and the second data transfer protocol both comprise different protocol layers, and
    means for using a determined protocol level as an interworking level between the first data transfer protocol and the second data transfer protocol so that the interworking level of the second data transfer protocol interworks with the respective level of the first data transfer protocol; and
    means for using protocols on at least two layers comprising a higher protocol layer and a lower protocol layer, wherein the higher protocol layer comprises a short message transfer protocol (SM-TP) and the interworking level comprises a protocol under the short message transfer protocol (SM-TP) and the protocol under the transfer protocol interworks with the respective DECT protocol, such that the transfer protocol (SM-TP) is transmitted between the portable part and the short message service center substantially intact.

26. A system for transmitting short messages between a portable part (PP), a fixed part (FP), and a short message service center (SC) so that the information is transferred between the portable part (PP) and the fixed part (FP) through a radio interface, comprising:
    means for using a first data transfer protocol corresponding with the DECT system in the data transfer between the portable part (PP) and the fixed part (FP);
    means for using a second data transfer protocol in the data transfer between the fixed part (FP) and the short message service center (SC), wherein the first data transfer protocol and the second data transfer protocol both comprise different protocol layers;
    means for using a determined protocol level as an interworking level between the first data transfer protocol and the second data transfer protocol so that the interworking level of the second data transfer protocol interworks with the respective level of the first data transfer protocol;
    means for using protocols on three layers, with the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message control protocol (SM-CP) is used as the interworking level, and the short message control protocol interworks with the respective DECT protocol such that the short message transfer protocol (SM-TP) and the short message relay protocol (SM-RP) are transmitted through the fixed part (FP) substantially intact; and
    means for transmitting short messages between the fixed part and the short message service center through a GSM mobile services switching center (MSC).

27. A system for transmitting short messages between a portable part (PP), a fixed part (FP) and a short message service center (SC) so that the information is transferred between the portable part (PP) and the fixed part (FP) through a radio interface, comprising:

means for using a first data transfer protocol corresponding with the DECT system in the data transfer between the portable part (PP) and the fixed part (FP);

means for using a second data transfer protocol in the data transfer between the fixed part (FP) and the short message service center (SC), wherein the first data transfer protocol and the second data transfer protocol both comprise different protocol layers;

means for using a determined protocol level as an interworking level between the first data transfer protocol and the second data transfer protocol so that the interworking level of the second data transfer protocol interworks with the respective level of the first data transfer protocol;

means for using protocols on three layers, with the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message relay protocol (SM-RP) is used as the interworking level, and the short message relay protocol (SM-RP) and the short message control protocol (SM-CP) interwork with the respective DECT protocols such that the short message transfer protocol (SM- TP) is transmitted through the fixed part (FP) substantially intact; and means for transmitting short messages between the fixed part and the short message service center through a GSM mobile services switching center (MSC).

28. A system for transmitting short messages between a portable part (PP), a fixed part (FP) and a short message service center (SC) so that the information is transferred between the portable part (PP) and the fixed part (FP) through a radio interface, comprising:

means for using a first data transfer protocol corresponding with the DECT system in the data transfer between the portable part (PP) and the fixed part (FP);

means for using a second data transfer protocol in the data transfer between the fixed part (FP) and the short message service center (SC), wherein the first data transfer protocol and the second data transfer protocol both comprise different protocol layers;

means for using a determined protocol level as an interworking level between the first data transfer protocol and the second data transfer protocol so that the interworking level of the second data transfer protocol interworks with the respective level of the first data transfer protocol;

means for using protocols on three layers, with the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message relay protocol (SM-RP) interworks with the respective DECT protocol such that the short message control protocol (SM-CP) is not transmitted between the portable part and the fixed part, and the short message transfer protocol (SM-TP) is transmitted through the fixed part (FP) substantially intact; and means for transmitting short messages between the fixed part and the short message service center through a GSM mobile services switching center (MSC).

29. A system for transmitting short messages between a portable part (PP), a fixed part (FP) and a short message service center (SC) so that the information is transferred between the portable part (PP) and the fixed part (FP) through a radio interface, comprising:

means for using a first data transfer protocol corresponding with the DECT system in the data transfer between the portable part (PP) and the fixed part (FP);

means for using a second data transfer protocol in the data transfer between the fixed part (FP) and the short message service center (SC), wherein the first data transfer protocol and the second data transfer protocol both comprise different protocol layers;

means for using a determined protocol level as an interworking level between the first data transfer protocol and the second data transfer protocol so that the interworking level of the second data transfer protocol interworks with the respective level of the first data transfer protocol;

means for using protocols on three layers, with the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message transfer protocol (SM-TP) is used as interworking level, and the short message transfer protocol (SM-TP), the short message relay protocol (SM-RP), and the short message control protocol (SM-CP) interwork with the respective DECT protocols; and means for transmitting short messages between the fixed part and the short message service center through a GSM mobile services switching center (MSC).

30. A system for transmitting short messages between a portable part (PP), a fixed part (FP) and a short message service center (SC) so that the information is transferred between the portable part (PP) and the fixed part (FP) through a radio interface, comprising:

means for using a first data transfer protocol corresponding with the DECT system in the data transfer between the portable part (PP) and the fixed part (FP);

means for using a second data transfer protocol in the data transfer between the fixed part (FP) and the short message service center (SC), wherein the first data transfer protocol and the second data transfer protocol both comprise different protocol layers;

means for using a determined protocol level as an interworking level between the first data transfer protocol and the second data transfer protocol so that the interworking level of the second data transfer protocol interworks with the respective level of the first data transfer protocol;

means for using protocols on three layers, with the lowest of the three protocol layers comprising a short message control protocol (SM-CP), the middle of the three protocol layers comprising a short message relay protocol (SM-RP) and the highest of the three protocol layers comprising a short message transfer protocol (SM-TP), wherein the short message transfer protocol (SM-TP) is used as the interworking level, and the short message transfer protocol (SM-TP) and the short message relay protocol interwork with the respective DECT protocols such that the information of the short message control protocol (SM-CP) is not transmitted between the portable part (PP) and the fixed part (FP); and means for transmitting short messages between the fixed part and the short message service center through a GSM mobile services switching center (MSC).

* * * * *